US012478864B2

(12) United States Patent
Liu

(10) Patent No.: US 12,478,864 B2
(45) Date of Patent: Nov. 25, 2025

(54) SHAFT JOYSTICK

(71) Applicant: Shenzhen Qanba Technology Development Co., Ltd, Shenzhen (CN)

(72) Inventor: Kai Liu, Shenzhen (CN)

(73) Assignee: Shenzhen Qanba Technology Development Co., Ltd, Shenzhen (CN)

( * ) Notice: Subject to any disclaimer, the term of this patent is extended or adjusted under 35 U.S.C. 154(b) by 379 days.

(21) Appl. No.: 18/126,490

(22) Filed: Mar. 27, 2023

(65) Prior Publication Data

US 2023/0226440 A1 Jul. 20, 2023

(30) Foreign Application Priority Data

May 10, 2022 (CN) ........................ 202221118773.6

(51) Int. Cl.
*A63F 13/24* (2014.01)
*G05G 9/047* (2006.01)

(52) U.S. Cl.
CPC ............ *A63F 13/24* (2014.09); *G05G 9/047* (2013.01); *G05G 2009/04703* (2013.01)

(58) Field of Classification Search
CPC ......... A63F 13/24; A63F 13/98; G05G 9/047; G05G 2009/04703; G05G 1/04
See application file for complete search history.

(56) References Cited

U.S. PATENT DOCUMENTS

| | | | | |
|---|---|---|---|---|
| 6,580,418 | B1 * | 6/2003 | Grome | A63F 13/22 345/161 |
| 2002/0054011 | A1 * | 5/2002 | Bruneau | A63F 13/245 345/156 |
| 2003/0144752 | A1 | 7/2003 | Furukawa | |
| 2004/0095320 | A1 | 5/2004 | Furukawa | |
| 2018/0321704 | A1 | 11/2018 | Sirohiwala et al. | |

* cited by examiner

*Primary Examiner* — Peter J Iannuzzi
(74) *Attorney, Agent, or Firm* — Zhigang Ma

(57) ABSTRACT

A shaft joystick is provided, which relates to the technical field of game peripherals. The shaft joystick includes an upper cover body, a lower cover body and a lever; the lower cover body is provided with an antiskid pad; at least one weight stack is detachably assembled between the upper cover body and the lower cover body; and a circumferential side of the weight stack is locked to the lower cover body. An accommodating slot for mounting the weight stack is formed in the lower cover body; and a bolt hole for locking the weight stack is formed in the circumferential side of a bottom of the accommodating slot. By the adoption of the above technical solution, the shaft joystick has the advantages of improving the input accuracy of the joystick and enhancing the input experience of the shaft joystick for users.

11 Claims, 5 Drawing Sheets

SHAFT JOYSTICK

TECHNICAL FIELD

The present disclosure relates to the technical field of game peripherals, specifically to a shaft joystick.

BACKGROUND

Shaft joystick is a common component of an electronic game console. By manipulating its buttons and lever, simulated characters on mobile phones, computers and other electronic devices can be controlled to achieve the purpose of playing a game.

At present, an increasingly high requirement is put forward to the weight of shaft joystick products. Many lever type shaft joysticks are placed on a desk in the market. Due to a light weight, the shaft joystick is very easy to move during operation even if a friction coefficient is increased by an antiskid pad, a suction disk or the like, so that the input accuracy is obviously reduced, resulting in an unideal user experience. In addition, most joysticks are plastic products, which also restrains the improvement on the weight of the joysticks. Therefore, improvement is urgently needed.

SUMMARY

The present disclosure aims to provide a shaft joystick for the defects and shortcomings in the prior art. The input stability of the shaft joystick is ensured by means of appropriately increasing the weight of the shaft joystick. By cooperation with an antiskid pad at the bottom, it is favorable for solving the problem of movement in operation. The shaft joystick has the advantages of improving the input accuracy of the joystick and enhancing the input experience of the shaft joystick for users.

In order to achieve the above objective, the technical solution adopted in the present disclosure is as follows: A shaft joystick includes an upper cover body, a lower cover body and a lever; the lower cover body is provided with an antiskid pad; at least one weight stack is detachably assembled between the upper cover body and the lower cover body; and a circumferential side of the weight stack is locked to the lower cover body.

In a further setting of the present disclosure, an accommodating slot for mounting the weight stack is formed in the lower cover body; and a bolt hole for locking the weight stack is formed in the circumferential side of a bottom of the accommodating slot.

In a further setting of the present disclosure, a function button region, a touch region and a game button region are arranged on the upper cover body.

In a further setting of the present disclosure, the weight stack is located below the game button region; and a center of gravity of the weight stack and a center of gravity of the lever are epidural.

In a further setting of the present disclosure, one end of the lever is detachably assembled in the lower cover body through a bolt; and an unlocking end of the lower cover body close to the bolt is movably provided with an unlocking hole cap for locking or unlocking the bolt.

In a further setting of the present disclosure, the unlocking hole cap includes a rotary hole cap piece and a hardware unlocking member;

a mounting slot is formed in an unlocking end of the lower cover body close to the bolt; at least one open position for picking and placing the unlocking hole cap and one close position for preventing the unlocking hole cap from falling off are arranged on the mounting slot.

In a further setting of the present disclosure, a hand support portion is arranged on one side of the upper cover body; and the hand support portion includes a hand supporting region and a 45-degree wrist fitting region.

In a further setting of the present disclosure, an open storage cavity is arranged in a space below the 45-degree wrist fitting region.

In a further setting of the present disclosure, the storage cavity is used for storing a USB data wire.

By the adoption of the above technical solution, the present disclosure has the following beneficial effects.

1. In the present disclosure, the weight stack is arranged between the upper cover body and the lower cover body. During use, a user can select to mount several weight stacks according to an own use need, so as to increase the weight of the shaft joystick and ensure the input stability of the shaft joystick. By cooperation with the antiskid pad at the bottom, it is favorable for solving the problem of movement in operation. The shaft joystick has the advantages of improving the input accuracy and enhancing the input experience of the shaft joystick for users.
2. In the present disclosure, the open storage cavity is arranged below the 45-degree wrist fitting region formed by the cooperation between the upper cover body and the lower cover body, and is used for storing the USB data wire, so that the entire shaft joystick is reasonably stored. The existing structural space is fully used, so that the overall shaft joystick is simple and beautiful, and is quick and easy to fold and unfold.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are merely some embodiments of the present disclosure. Those ordinarily skilled in the art also can acquire other drawings according to the provided drawings without doing creative work.

Numerals in the drawings.

Figure 1:
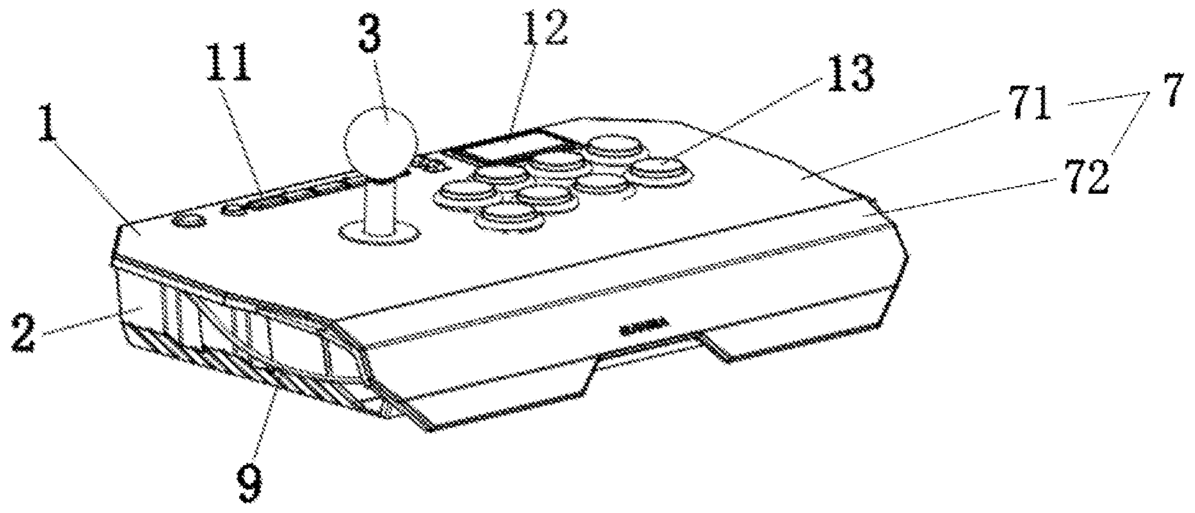
FIG. 1 is a schematic structural diagram of this embodiment.

1: upper cover body; 2: lower cover body; 3: lever; 4: weight stack; 22: accommodating slot; 23: bolt hole; 11: function button region; 12: touch region; 13: game button region; 5: bolt; 6: unlocking hole cap; 61: rotary hole cap piece; 62: hardware unlocking member; 24: mounting slot; 241: open position; 242: close position; 7: hand support portion; 71: hand supporting region; 72: 45-degree wrist fitting region; 8: storage cavity; and 9: USB data wire.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

This embodiment relates to a shaft joystick, as shown in FIG. 1 to FIG. 5, including an upper cover body 1, a lower cover body 2 and a lever 3. The lower cover body 2 is provided with an antiskid pad (not shown in the figure). At least one weight stack 4 is detachably assembled between the upper cover body 1 and the lower cover body 2. A circumferential side of the weight stack 4 is locked to the lower cover body 2. By means of the arrangement of the weight stack 4 to increase the weight of the shaft joystick, a user can assemble one or several weight stacks 4 according to an own actual need during use, which is conductive to maintaining the overall stability of the shaft joystick. Furthermore, the weight stack 4 is mounted inside the shaft joystick to ensure that the appearance of the shaft joystick is not affected. Due to the antiskid pad at the bottom of the lower cover body 2, the shaft joystick is not easy to move during operation, so that the input accuracy is improved, and the user experience is improved.

Figure 2:
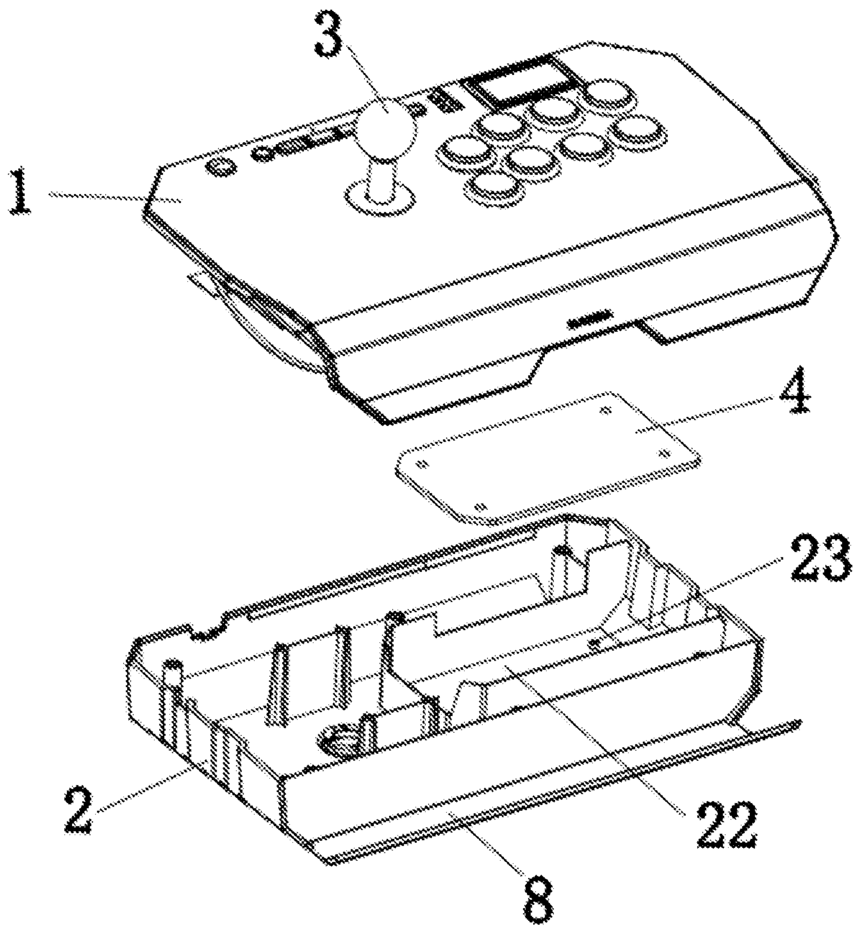
FIG. 2 is a schematic exploded diagram in this embodiment.

As shown in FIG. 2, an accommodating slot 22 for mounting the weight stack 4 is formed in the lower cover body 2. A bolt hole 23 for locking the weight stack 4 is formed in the circumferential side of a bottom of the accommodating slot 22. It should be noted that in this embodiment, there can be five weight stacks 4 at most, so that the greatest depth of a side wall of the accommodating slot 22 is equal to the thicknesses of the five weight stacks 4. When the weight stacks 4 are mounted, the upper cover body 1 and the lower cover body 2 first need to be removed, and the weight stacks 4 are then stacked in the accommodating slot 22. The accommodating slot 22 achieves a limitation and storage effect on the weight stacks, so that it is convenient to align the circumferential sides of the weight stacks 4 with the bolt hole 23 to realize threaded locking. Finally, the upper cover body 1 and the lower cover body 2 are assembled. Since the weight stacks 4 are always locked on the lower cover body 2, the weight stacks can be effectively prevented from shaking relative to the upper cover body 1 and the lower cover body 2 in the use process.

As shown in FIG. 1, a function button region 11, a touch region 12 and a game button region 13 are arranged on the upper cover body 1. The function button region 11 is arranged in the outermost row of the shaft joystick to control the selection of game functions. The touch region 12 is arranged at the upper right side of the shaft joystick to increase the touch control of a game. The game button region 13 is arranged at the left center and is symmetric with the lever 3, so as to achieve operation convenience.

Figure 3:
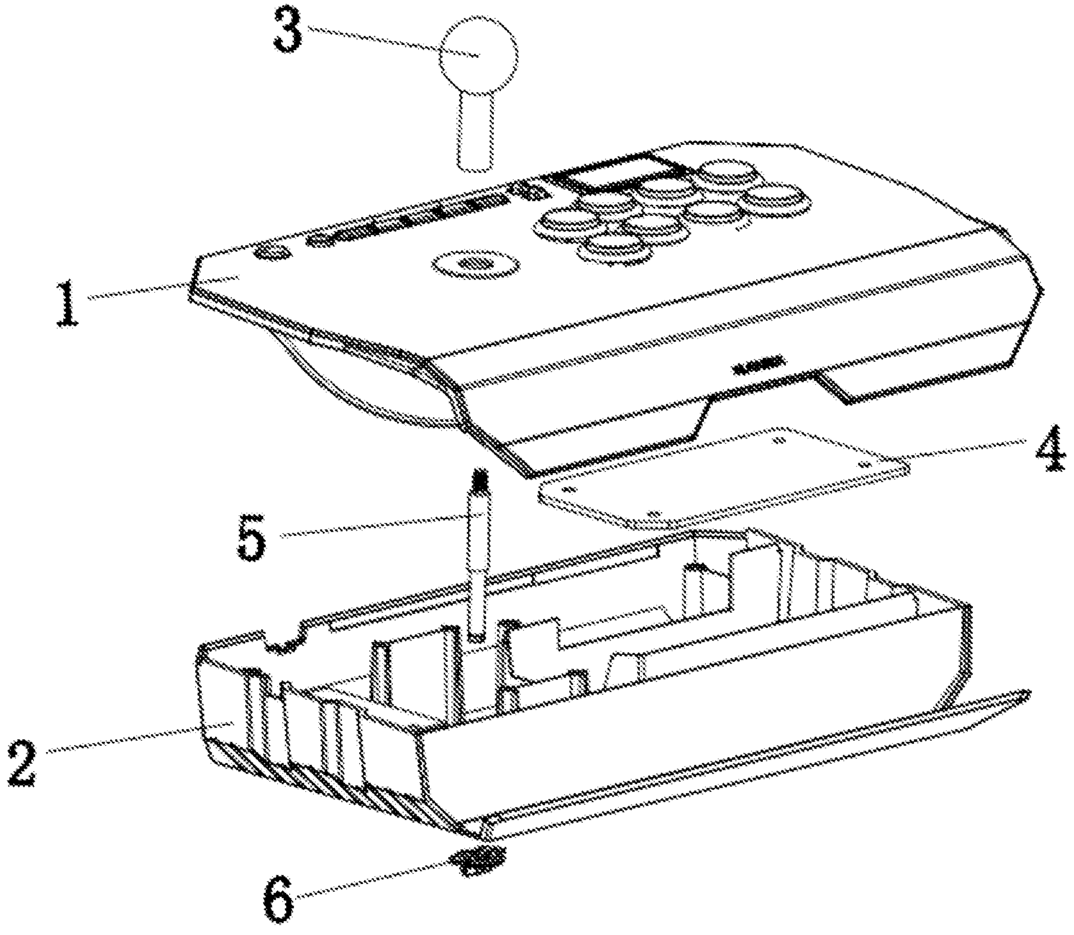
FIG. 3 is another schematic exploded diagram in this embodiment.

As shown in FIG. 3, in this embodiment, the weight stack 4 is located below the game button region 13, and a center of gravity of the weight stack 4 and a center of gravity of the lever 3 are epidural. When the user operates the shaft joystick, the lever 3 and the game button region 13 are main input components, that is, the lever 3 and the game button region 13 are main force bearing points, so that the weight stack 4 is arranged below the game button region 13, which increases the weight and can ensure that the overall shaft joystick is balanced and the force is balanced.

As shown in FIG. 1 to FIG. 3, one side of the upper cover body 1 is provided with a hand support portion 7. The hand support portion 7 includes a hand supporting region 71 and a 45-degree wrist fitting region 72. The hand supporting region 71 is arranged below the lever 3 and the game button region 13. The 45-degree wrist fitting region 72 is arranged on an inner side the shaft joystick and connected with the hand supporting region 71. When in use, the antiskid pad at the bottom contacts a bearing surface to play a good antiskid role. The several weight stacks 4 added further improves the stability of the gamepad, so that the shaft joystick is not easy to move. The wrist of the user is successively supported by the 45-degree wrist fitting region 72 and the hand supporting region 71, so that the force on the wrist is uniform, which is conductive to improving the operation convenience of the hand.

As shown in FIG. 1 to FIG. 3, an open storage cavity 8 is arranged in a space below the 45-degree wrist fitting region 72. In this embodiment, the storage cavity 8 is used for storing a USB data wire 9, so that the whole shaft joystick is stored reasonably. The existing structural space is fully used. Furthermore, the structure is simple and reasonable, so that convenient storage is achieved.

As shown in FIG. 3, in this embodiment, one end of the lever 3 is detachably assembled in the lower cover body 2 through the bolt 5. An unlocking end of the lower cover body 2 close to the bolt 5 is movably provided with an unlocking hole cap 6 for locking or unlocking the bolt 5. Therefore, when a ball top of the lever 3 is removed or mounted, it is not necessary to open the entire shaft joystick, but only the built-in unlocking hole cap 6 is taken down. The bolt 5 is locked or unlocked by using the unlocking hole cap 6 to mount or remove the lever 3. thus achieving the characteristics of practicability, quickness, convenient storage and the like.

Figure 4:
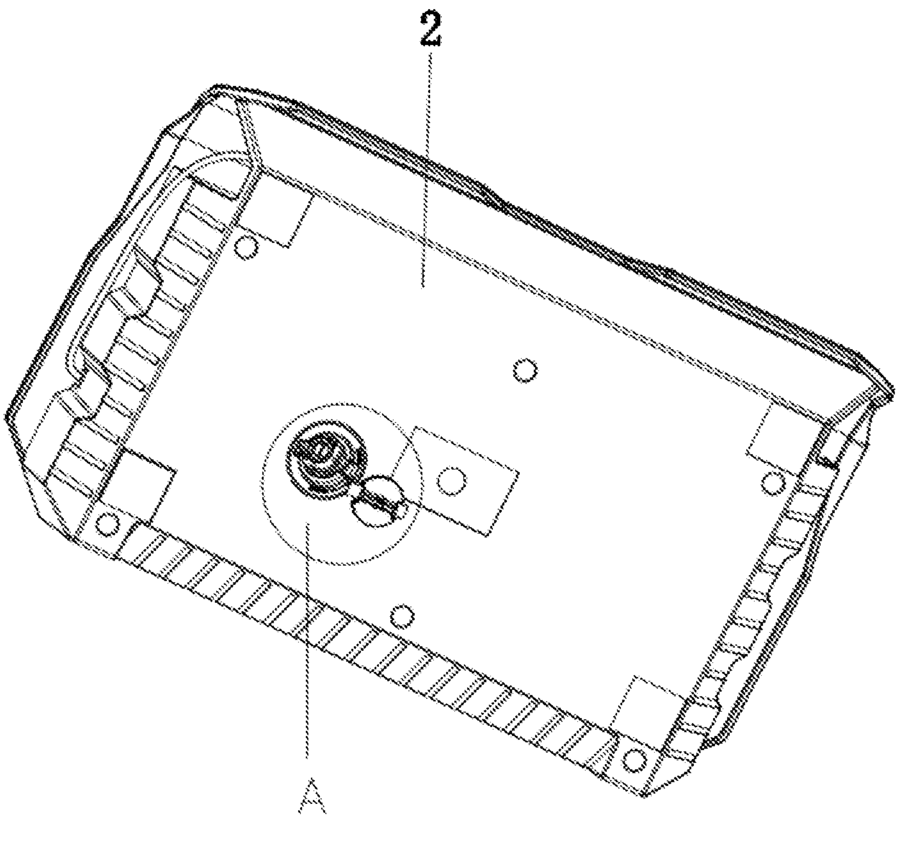
FIG. 4 is another schematic structural diagram of this embodiment.
Figure 5:
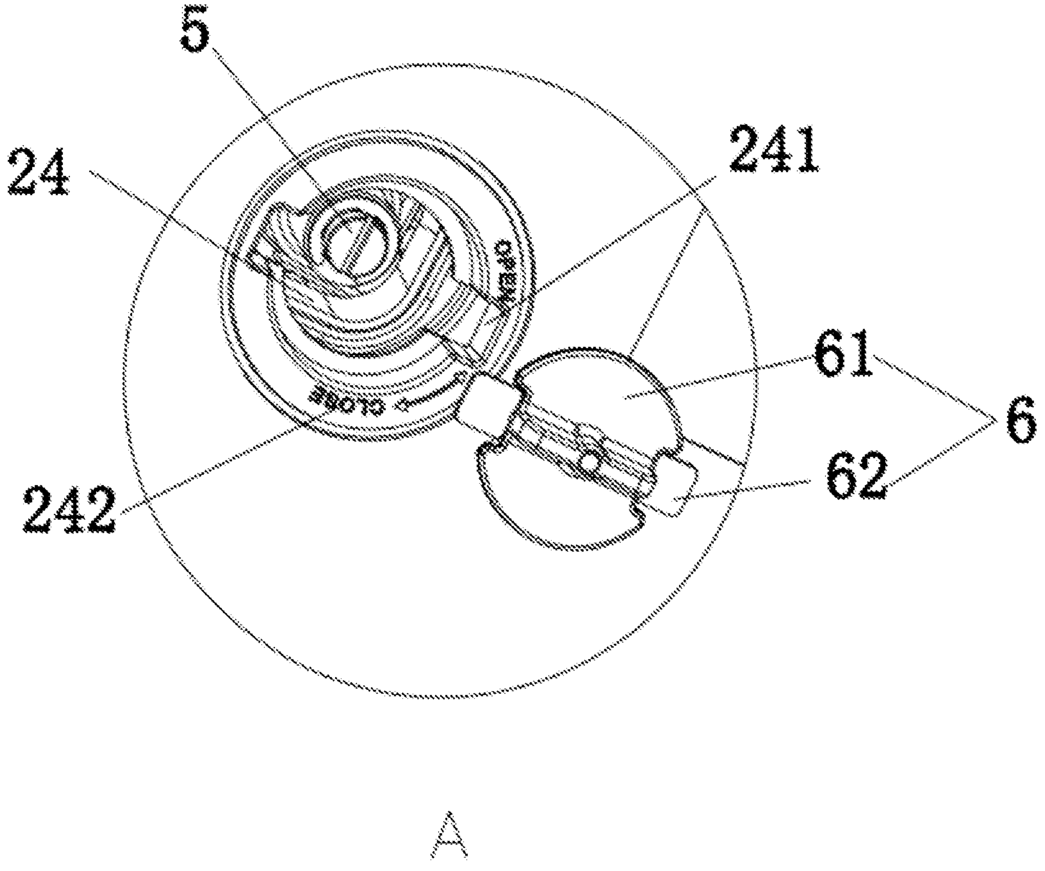
FIG. 5 is a schematic enlarged diagram of the part A in FIG. 4.

As shown in FIG. 3 to FIG. 5, the unlocking hole cap 6 includes a rotary hole cap piece 61 and a hardware unlocking member 62. Specifically, the bolt 5 in this embodiment is a slot type bolt 5, so the hardware unlocking member 62 on the unlocking hole cap 6 is slot type. The rotary hole cap piece 61 is provided with a holding portion for user operation, and the slot type hardware unlocking member 62 is symmetrically arranged on the rotary hole cap piece 61. A mounting slot 24 is formed in an unlocking end of the lower cover body 2 close to the bolt 5. At least one open position 241 for picking and placing the unlocking hole cap 6 and one close position 242 for preventing the unlocking hole cap 6 from falling off are arranged on the mounting slot 24.

As shown in FIG. 5, to remove the lever 3, the rotary hole cap piece 61 is held and rotated a certain angle to the left/right until the hardware unlocking member 62 is aligned with the open position 241 of the mounting slot 24. The entire unlocking hole cap 6 is then taken down, so that the unlocking end of the bolt 5 is exposed in the mounting slot 24. A user can unscrew the bolt 5 using the hardware unlocking member 62 to remove the lever 3. After the removal is completed, the hardware unlocking member 62 is aligned with the open position 241 and is inserted into the mounting slot 24; the rotary hole cap piece 61 is operated and rotated a certain angle to the close position 242 to complete mounting of the unlocking hole cap 6.

By the adoption of the above technical solution, the present disclosure has the beneficial effects below: The weight stack 4 is arranged between the upper cover body 1 and the lower cover body 2. During use, a user can select to mount several weight stacks 4 according to an own use need, so as to increase the weight of the shaft joystick and ensure the input stability of the shaft joystick. By cooperation with the antiskid pad at the bottom, it is favorable for solving the problem of movement in operation. The shaft joystick has the advantages of improving the input accuracy and enhancing the input experience of the joystick 3 for users. In addition, the open storage cavity 8 is arranged below the 45-degree wrist fitting region 72 formed by the cooperation between the upper cover body 1 and the lower cover body 2, and the open storage cavity 8 is used for storing the USB data wire 9, so that the entire shaft joystick is reasonably stored. The existing structural space is fully used, so that the overall shaft joystick is simple and beautiful, and is quick and easy to fold and unfold.

What is claimed is:

1. A shaft joystick, comprising an upper cover body (1), a lower cover body (2) and a lever (3), wherein the lower cover body (2) is provided with an antiskid pad; at least one weight stack (4) is detachably assembled between the upper cover body (1) and the lower cover body (2); and a circumferential side of the weight stack (4) is locked to the lower cover body (2);

wherein an accommodating slot (22) for mounting the weight stack (4) is formed in the lower cover body (2); and a bolt hole (23) for locking the weight stack (4) is formed in the circumferential side of a bottom of the accommodating slot (22).

2. The shaft joystick according to claim 1, wherein a function button region (11), a touch region (12) and a game button region (13) are arranged on the upper cover body (1).

3. The shaft joystick according to claim 2, wherein the weight stack (4) is located below the game button region (13).

4. The shaft joystick according to claim 1, wherein one end of the lever (3) is detachably assembled in the lower cover body (2) through a bolt (5); and an unlocking end of the lower cover body (2) close to the bolt (5) is movably provided with an unlocking hole cap (6) for locking or unlocking the bolt (5).

5. The shaft joystick according to claim 4, wherein the unlocking hole cap (6) comprises a rotary hole cap piece (61) and a hardware unlocking member (62);

a mounting slot (24) is formed in an unlocking end of the lower cover body (2) close to the bolt (5); at least one open position (241) for picking and placing the unlocking hole cap (6) and one close position (242) for preventing the unlocking hole cap (6) from falling off are arranged on the mounting slot (24).

6. The shaft joystick according to claim 5, wherein the bolt (5) is a slot type bolt; the hardware unlocking member (62) on the unlocking hole cap (6) is slot type; a holding portion is arranged on the rotary hole cap piece (61); the slot type hardware unlocking member (62) is symmetrically arranged on the rotary hole cap piece (61).

7. The shaft joystick according to claim 5, wherein the rotary hole cap piece (61) is held, so that the rotary hole cap piece (61) is rotated a certain angle to the left or the right until the hardware unlocking member (62) is aligned with the open position (241) of the mounting slot (24); the entire unlocking hole cap (6) is taken down, so that the unlocking end of the bolt (5) is exposed in the mounting slot (24); the bolt (5) is unscrewed using the hardware unlocking member (62) to remove the lever (3); the hardware unlocking member (62) is aligned with the open position (241) and is inserted into the mounting slot (24); the rotary hole cap piece (61) is operated, so that the rotary hole cap piece (61) is rotated a certain angle to the close position (242) to complete mounting of the unlocking hole cap (6).

8. The shaft joystick according to claim 1, wherein a hand support portion (7) is arranged on one side of the upper cover body (1); and the hand support portion (7) comprises a hand supporting region (71) and a 45-degree wrist fitting region (72).

9. The shaft joystick according to claim 8, wherein an open storage cavity (8) is arranged in a space below the 45-degree wrist fitting region (72).

10. The shaft joystick according to claim 9, wherein the storage cavity (8) is also used for storing a USB data wire (9).

11. The shaft joystick according to claim 9, wherein the hand supporting region (71) is arranged below the lever (3); and the 45-degree wrist fitting region (72) is arranged on an inner side of the lever (3) and is connected with the hand supporting region (71).

* * * * *